United States Patent
Moriyama et al.

(10) Patent No.: US 9,291,785 B2
(45) Date of Patent: Mar. 22, 2016

(54) OPTICAL MODULE

(71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/308,864

(22) Filed: Jun. 19, 2014

(65) Prior Publication Data

US 2015/0023637 A1   Jan. 22, 2015

(30) Foreign Application Priority Data

Jul. 18, 2013  (JP) ................... 2013-149830

(51) Int. Cl.
- *G02B 6/36* (2006.01)
- *G02B 6/42* (2006.01)
- *G02B 6/38* (2006.01)

(52) U.S. Cl.
CPC ............ *G02B 6/4292* (2013.01); *G02B 6/3879* (2013.01); *G02B 6/3885* (2013.01); *G02B 6/421* (2013.01); *G02B 6/424* (2013.01); *G02B 6/428* (2013.01)

(58) Field of Classification Search
None
See application file for complete search history.

(56) References Cited

U.S. PATENT DOCUMENTS

| | | | | |
|---|---|---|---|---|
| 3,914,880 A * | 10/1975 | Dakss | ................... | G02B 6/382 385/65 |
| 4,427,879 A * | 1/1984 | Becher | ................. | G02B 6/2552 250/215 |
| 4,614,402 A * | 9/1986 | Caron | ................... | G02B 6/382 385/62 |
| 4,778,243 A * | 10/1988 | Finzel | ................. | G02B 6/3806 385/55 |
| 4,830,456 A * | 5/1989 | Kakii | ................... | G02B 6/3656 385/59 |
| 4,850,670 A * | 7/1989 | Mathis | ................... | G02B 6/266 385/68 |
| 4,955,976 A * | 9/1990 | Freeman | .............. | G02B 6/3825 385/55 |
| 4,983,012 A * | 1/1991 | Saito | ................... | G02B 6/3839 385/56 |
| 5,073,046 A * | 12/1991 | Edwards | .............. | G02B 6/3869 385/78 |
| 5,082,346 A * | 1/1992 | Myers | ................. | G02B 6/3825 385/54 |
| 5,140,663 A * | 8/1992 | Edwards | .............. | G02B 6/3869 385/139 |
| 5,222,168 A * | 6/1993 | Saito | ................... | G02B 6/3825 156/158 |
| 5,600,747 A * | 2/1997 | Yamakawa | .......... | G02B 6/3879 385/59 |
| 5,619,605 A * | 4/1997 | Ueda | ................... | G02B 6/3821 385/54 |
| 5,689,598 A * | 11/1997 | Dean, Jr. | ................ | G02B 6/389 385/53 |
| 6,287,017 B1 * | 9/2001 | Katsura | .................. | B29C 33/44 249/64 |
| 6,511,233 B1 * | 1/2003 | Steijer | .................. | G02B 6/4292 385/55 |
| 6,572,275 B2 * | 6/2003 | Shimoji | .............. | G02B 6/3821 385/56 |
| 6,712,521 B1 * | 3/2004 | Koreeda | .............. | G02B 6/3879 385/56 |
| 8,845,208 B2 * | 9/2014 | Tsujita | .................. | G02B 6/138 385/59 |
| 8,992,097 B2 * | 3/2015 | Koreeda | ................ | G02B 6/381 385/78 |
| 2003/0044125 A1 * | 3/2003 | Kiani | .................. | G02B 6/3821 385/78 |
| 2003/0223703 A1 * | 12/2003 | Chen | .................... | G02B 6/3821 385/78 |

FOREIGN PATENT DOCUMENTS

JP    2003-121699    4/2003

* cited by examiner

*Primary Examiner* — Uyen Chau N Le
*Assistant Examiner* — Chad Smith
(74) *Attorney, Agent, or Firm* — IPUSA, PLLC

(57) ABSTRACT

An optical module includes a first ferrule, a second ferrule that is aligned with the first ferrule via a positioning pin, a housing including a support part that supports the second ferrule, and a ferrule clip that is fastened to the housing and presses the first ferrule toward the second ferrule.

9 Claims, 6 Drawing Sheets

OPTICAL MODULE

CROSS-REFERENCE TO RELATED APPLICATION

The present application is based upon and claims the benefit of priority of Japanese Patent Application No. 2013-149830, filed on Jul. 18, 2013, the entire contents of which are incorporated herein by reference.

BACKGROUND OF THE INVENTION

1. Field of the Invention

An aspect of this disclosure relates to an optical module.

2. Description of the Related Art

Copper cables have been widely used for high-speed interfaces of supercomputers and high-end servers. However, because the transmission distance of copper cables decreases as the signal speed increases, the use of optical cables is increasing to achieve high-speed, long-distance transmission of signals.

The next generation interfaces being discussed in standards such as InfiniBand (registered trademark) of the InfiniBand Trade Association (IBTA), Enhanced Data Rate (EDR), and 100G Ethernet (registered trademark) have transmission distances of several tens of meters and require optical transmission lines. Japanese Laid-Open Patent Publication No. 2003-121699, for example, discloses an optical module for optically connecting a transmission line. The disclosed optical module connects, by butt coupling, a ferrule of an external line and a device-side ferrule with a low loss.

In Japanese Laid-Open Patent Publication No. 2003-121699, a plate-spring clip rotatably supported on a housing is used to "butt-couple" the ferrules. With this configuration, when the clip rotates, the clip contacts and applies a force to the ferrules. Thus, this configuration may damage and reduce the durability of the ferrules.

SUMMARY OF THE INVENTION

In an aspect of this disclosure, there is provided an optical module including a first ferrule, a second ferrule that is aligned with the first ferrule via a positioning pin, a housing including a support part that supports the second ferrule, and a ferrule clip that is fastened to the housing and presses the first ferrule toward the second ferrule.

DESCRIPTION OF EMBODIMENTS

Embodiments of the present invention are described below with reference to the accompanying drawings. Known configurations and materials of an optical module are omitted in the descriptions below.

Figure 1:
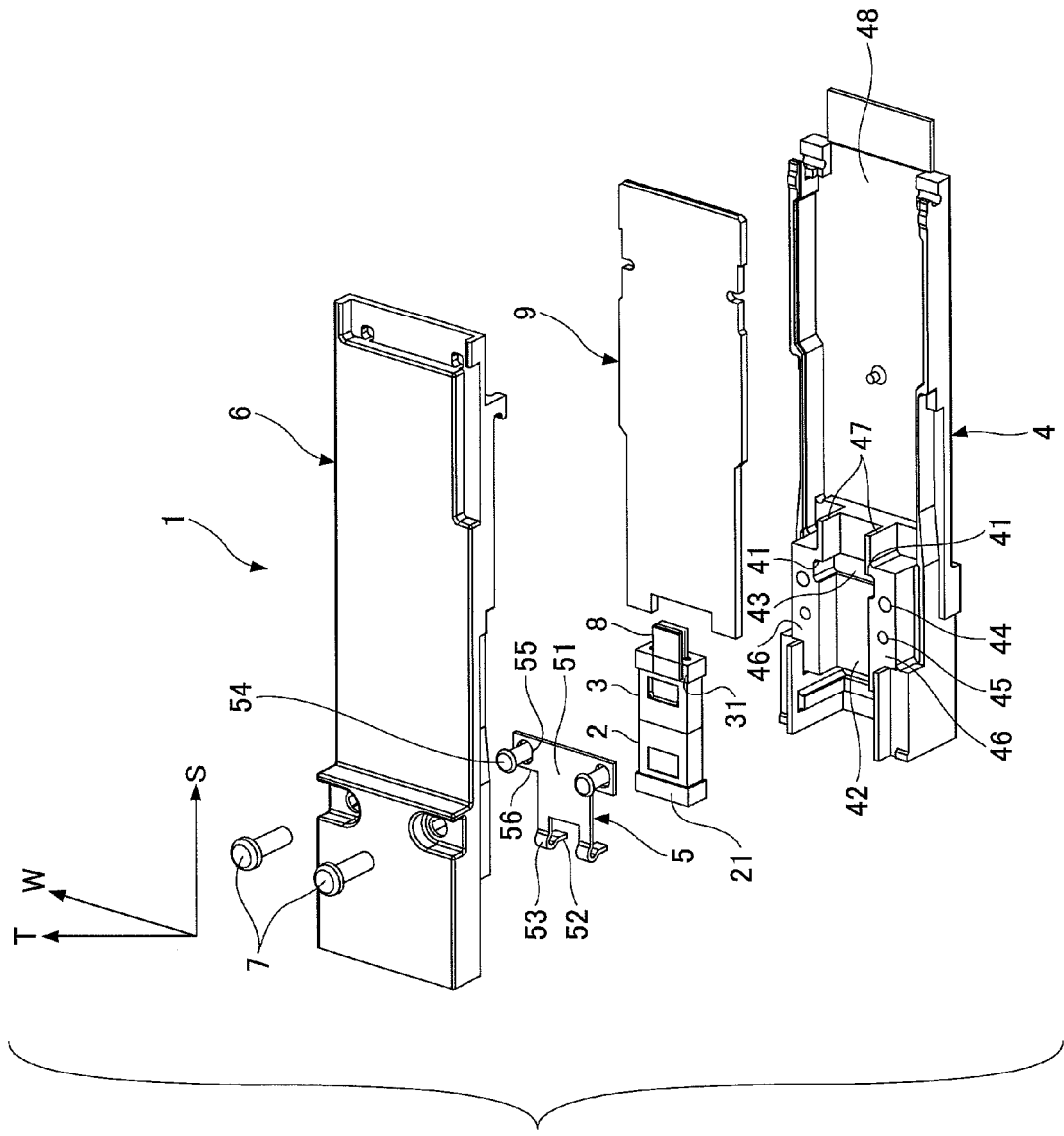
FIG. 1 is an exploded view of an optical module according to an embodiment.

As illustrated by FIG. 1, an optical module 1 of an embodiment includes a mechanically transferable (MT) ferrule 2 (an example of first ferrule) and a lens ferrule 3 (an example of second ferrule) that is aligned with the MT ferrule 2 by positioning pins described later. The optical module 1 also includes a lower cover 4 (housing) including support parts 41 that support the lens ferrule 3 in a direction opposite to a connecting direction S, and a ferrule clip 5 that is fastened to the lower cover 4 and presses the MT ferrule 2 toward the lens ferrule 3.

In FIG. 1, an arrow S indicates a connecting direction S in which the MT ferrule 2 is connected to the lens ferrule 3, an arrow T indicates a thickness direction T from the bottom of the lower cover 4 of the optical module 1 toward an opening of the lower cover 4, and an arrow W indicates a width direction W that is orthogonal to the connecting direction S and the thickness direction T. The connecting direction S, the thickness direction T, and the width direction W are relative to the components of the optical module 1, and do not necessarily indicate the leftward, rightward, and upward directions in FIG. 1. The support parts 41 are wall surfaces that are formed in the lower cover 4 and face the connecting direction S. The positioning pins extend in the connecting direction S.

Figure 2:
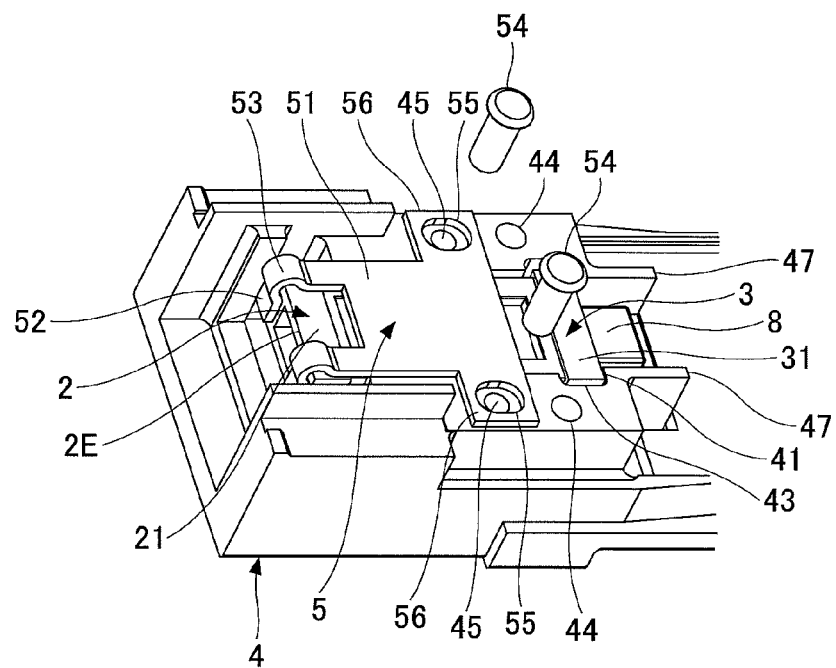
FIG. 2 is an enlarged view of a ferrule clip and a part of a lower cover.

FIG. 2 is an enlarged view of the ferrule clip 5 and a part of the lower cover 4. Referring to FIG. 1, the MT ferrule 2 is shaped like a cuboid and includes an enlarged part 21 formed at an end of the MT ferrule 2 that is opposite to another end of the MT ferrule 2 to be connected to the lens ferrule 3. The dimensions of the enlarged part 21 in the width direction W and the thickness direction T are greater than other parts of the MT ferrule 2. The lens ferrule 3 is also shaped like a cuboid and includes an enlarged part 31 formed at an end of the lens ferrule 3 that is opposite to another end of the lens ferrule 3 to be connected to the MT ferrule 3. The dimensions of the enlarged part 31 in the width direction W and the thickness direction T are greater than other parts of the lens ferrule 3. As illustrated by FIG. 2, the support parts 41 of the lower cover 4 support a right end face of the enlarged part 31.

The ferrule clip 5 includes a plate part 51 to be fastened to the lower cover 4, a pair of contact parts 52 that contact a left end face of the enlarged part 21 of the MT ferrule 2, and a pair of spring parts 53 that connect the contact parts 52 and the plate part 51 and bias the contact parts 52 toward the MT ferrule 2.

The spring parts 53 form bypassing parts that bypass (circumvent or do not contact) an edge 2E (ferrule edge) of the MT ferrule 2. The ferrule clip 5 including the spring parts 53 is made of a flexible metal material.

The ferrule clip 5 also includes screw holes 55. Screws 54 are inserted into the screw holes 55 to fasten the ferrule clip 5 to the lower cover 4. The screw holes 55 have an elongated shape and extend in a direction in which the positioning pins (not shown) extend, which is the same as the connecting direction S. The length of the screw holes 55 in the connecting direction S is longer than the diameter of the screws 54. The plate part 51 includes a pair of tabs 56 where the screw holes 55 are formed. The external diameter of a head of the screw 54 is greater than the length of the screw hole 55 in the width direction W.

Figure 3:
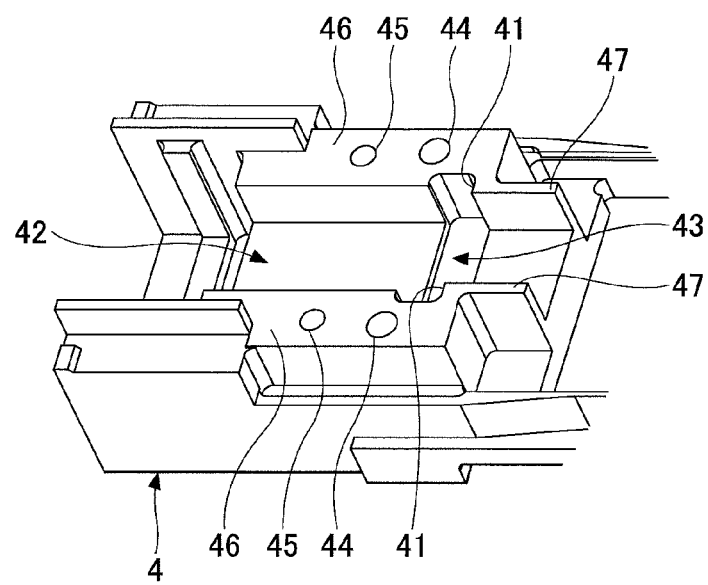
FIG. 3 is an enlarged view of a part of a lower cover.

FIG. 3 is an enlarged view of a part of the lower cover 4. As illustrated by FIG. 3, the lower cover 4 includes a groove 42 whose cross section is shaped like a square bracket. The MT ferrule 2 (excluding the enlarged part 21) and the lens ferrule 3 are fitted into the groove 42 to set their positions. A holding part 43 is formed in the lower cover 4 at a position that is closer to the support parts 41 than the groove 42. The holding part 43 holds or accommodates the enlarged part 31 of the lens ferrule 3, but allows the enlarged part 31 to move in the connecting direction S. The holding part 43 is wider and deeper than the groove 42 in the width direction W and the thickness direction T.

The lower cover 4 includes block parts 46 that are disposed lateral to the groove 42 in the width direction W. A female screw 44 corresponding to a screw 7 (see FIG. 1) and a female screw 45 corresponding to the screw 54 are formed in each of the block parts 46.

The female screws 44 are disposed closer to the support parts 41 than the female screws 45. A pair of housing walls 47 for housing a ferrule boot 8 are formed in the lower case 4 at a position that is farther from the groove. 42 than the support parts 41 in the connecting direction S.

The optical module 1 includes an optical waveguide (not shown) that extends from the lens ferrule 3 toward a photoelectric transducer (optical engine) (not shown). The optical module includes a printed-circuit board 9 and a connector mounted at a predetermined position on the printed-circuit board 9. The photoelectric transducer is connected to the connector and mounted on the printed-circuit board 9. A terminal (not shown) is formed at the right end of the printed-circuit board 9.

A part of the printed-circuit board 9 from the position at which the connector is mounted to the right end of the printed-circuit board 9 in FIG. 1 at which the terminal is formed is wider in the width direction W than another part of the printed-circuit board 9 on which the photoelectric transducer is mounted. The printed-circuit board 9 is housed in a board housing part 48 of the lower cover 4 that is farther from the groove 42 than the housing walls 47 in the connecting direction S.

Optical cables (not shown) extend from an end of the MT ferrule 2 that is opposite to another end of the MT ferrule 2 to be connected to the lens ferrule 3. The optical cables are placed in a pair of cable boots (not shown) via a pair of sleeves and caulking rings (not shown). Pull-tabs or latches (not shown) are attached to the cable boots.

Figure 4A:
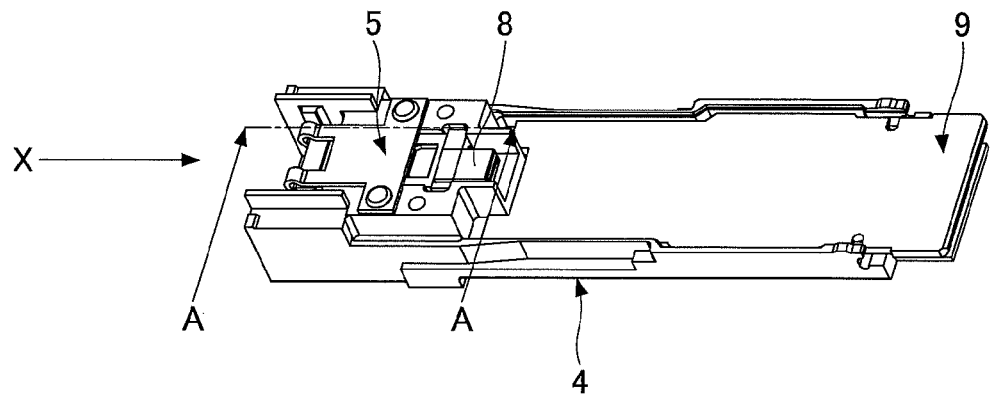
FIG. 4A is a drawing illustrating an optical module according to an embodiment.

FIG. 4A illustrates the optical module 1 where the MT ferrule 2 and the lens ferrule 3 are fitted into the lower cover 4, the ferrule boot 8 is placed between the housing walls 47, the printed-circuit board 9 is placed in the board housing part 48, and the ferrule clip 5 is fastened to the lower cover 4 by screwing the screws 54 into the female screws 45.

Figure 4B:
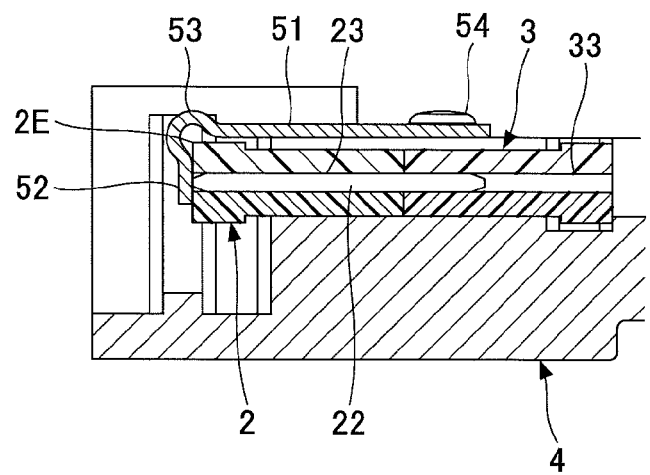
FIG. 4B is a cross-sectional view of the optical module taken along line A-A of FIG. 4A.
Figure 4C:
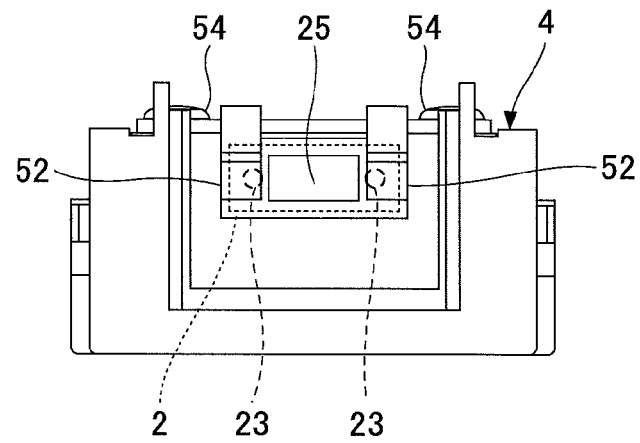
FIG. 4C is a side view of the optical module seen from a direction of an arrow X of FIG. 4A.

FIG. 4B is a cross-sectional view of the optical module 1 taken along line A-A of FIG. 4A. FIG. 4C is a side view of the optical module 1 seen from the direction of an arrow X of FIG. 4A. As illustrated by FIGS. 4B and 4C, a pair of through holes 23 arranged in the width direction W are formed in the MT ferrule 2, and a pair of through holes 33 corresponding to the through holes 23 are formed in the lens ferrule 3. Positioning pins 22 are inserted into the through holes 23 and the through holes 33. The relationship among the diameters and lengths of the positioning pins 22, the through holes 23, and the through holes 33 is determined according to a standard.

As illustrated by FIG. 4C, according to the present embodiment, the contact parts 52 are arranged in the width direction W to close the corresponding through holes 23. In FIG. 4C, an optical fiber (not shown) is placed in a rectangular area 25 that exists between the through holes 23.

As illustrated by FIG. 4B, the contact parts 52 are disposed parallel to an end surface of the MT ferrule 2 that is opposite to another end surface of the MT ferrule 2 connected to the lens ferrule 3. The plate part 51 is disposed orthogonal to the contact parts 52 and parallel to the bottom surface of the lower cover 4. Each combination of the spring part 53 and the contact part 52 forms an inverted question mark (?). The spring part 53 has a curved shape to bypass (circumvent or not contact) the upper-left edge 2E (ferrule edge) of the MT ferrule 2.

Figure 5:
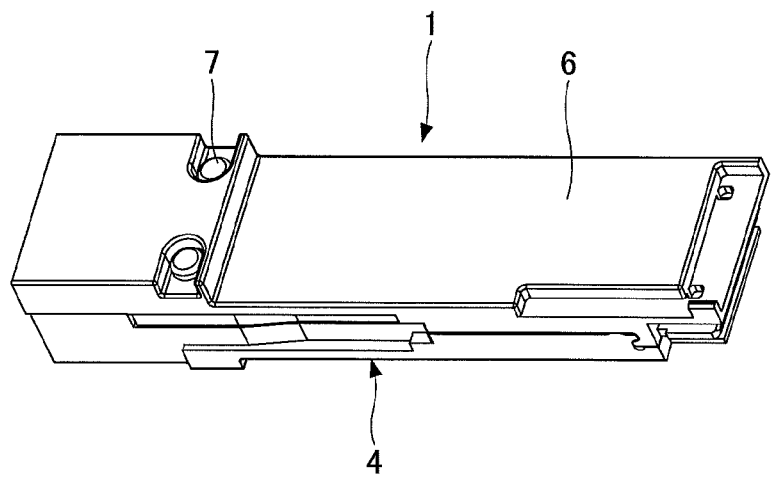
FIG. 5 is a drawing illustrating an optical module according to an embodiment.

FIG. 5 illustrates the optical module 1 where the upper cover 6 is fastened to the lower cover 4 with the screws 7.

Figure 6A:
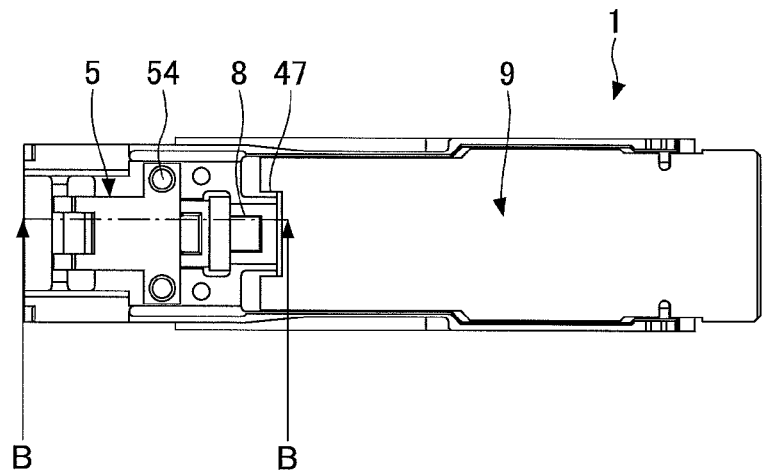
FIG. 6A is a drawing illustrating an optical module according to an embodiment.
Figure 6B:
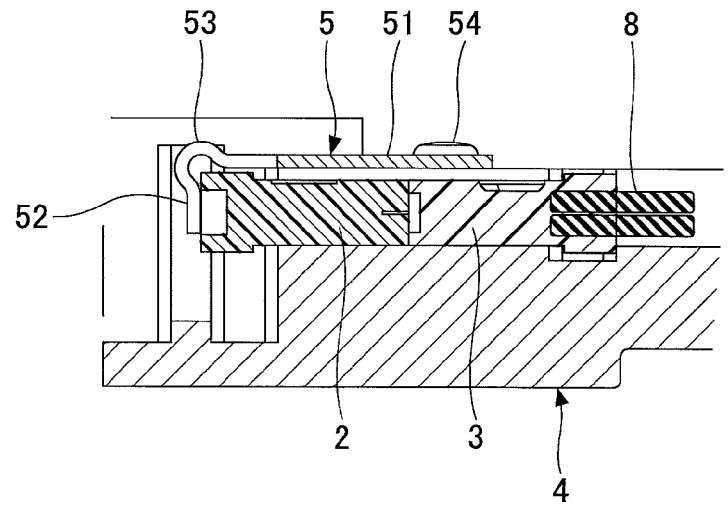
FIG. 6B is a cross-sectional view of the optical module taken along line B-B of FIG. 6A.

FIG. 6A illustrates the optical module 1, and FIG. 6B is a cross-sectional view of the optical module 1 taken along line B-B of FIG. 6A. Line B-B is closer to the center of the optical module 1 in the width direction W than line A-A of FIG. 4A. Accordingly, the cross section of FIG. 6B includes the MT ferrule 2, the lens ferrule 3, the plate part 51 of the ferrule clip 5, and the ferrule boot 8. Although the contact part 52 and the spring part 53 of the ferrule clip 5 are illustrated in FIG. 6B, they are not parts of the cross section.

Figure 7A:
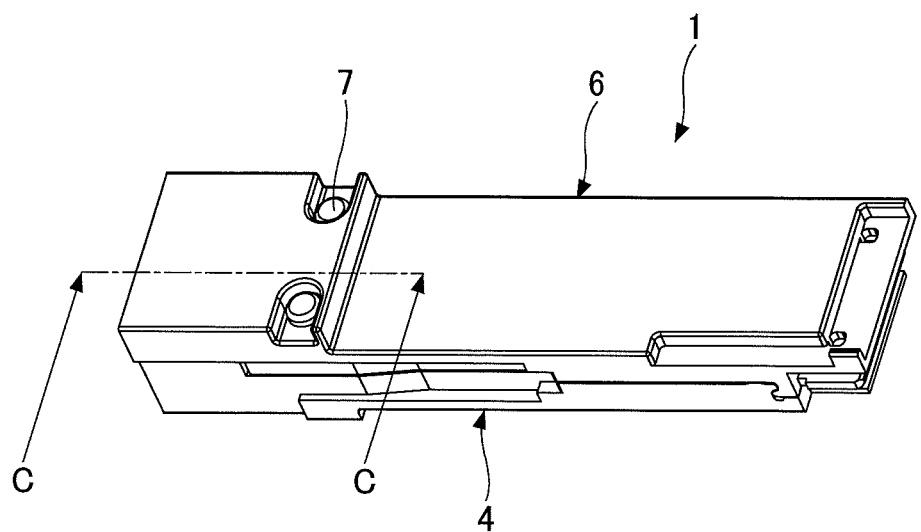
FIG. 7A is a drawing illustrating an optical module according to an embodiment.
Figure 7B:
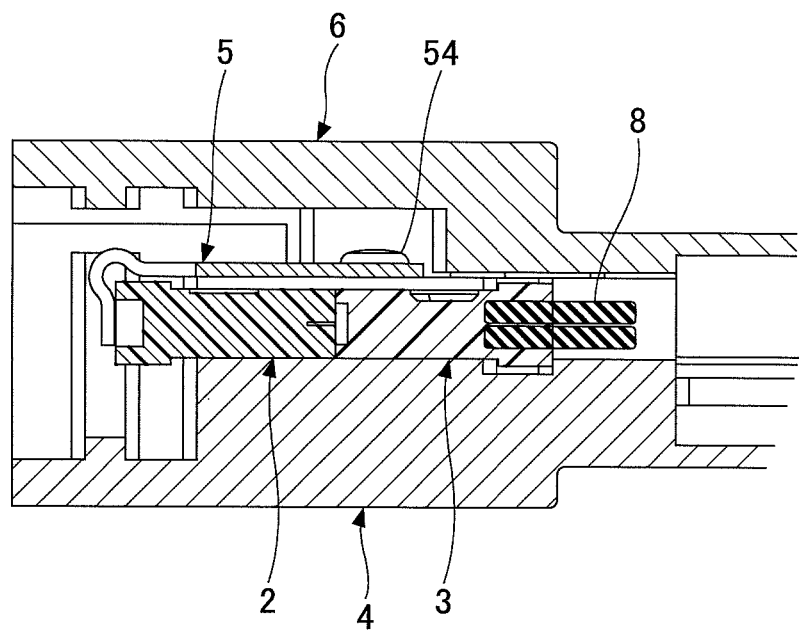
FIG. 7B is a cross-sectional view of the optical module taken along line C-C of FIG. 7A.

FIG. 7 illustrates the optical module 1 where the upper cover 6 is fastened to the lower cover 4 with the screws 7. FIG. 7B is a cross-sectional view of the optical module 1 taken along line C-C of FIG. 7A. An optical waveguide (not shown) extending from the lens ferrule 3 and the ferrule boot 8 is disposed in a space between the lower cover 4 and the upper cover 6 illustrated in FIG. 7B.

Figure 8A:
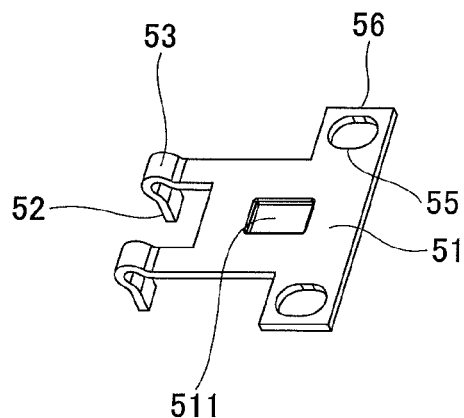
FIGS. 8A and 8B are drawings illustrating a variation of a ferrule clip.
Figure 8B:
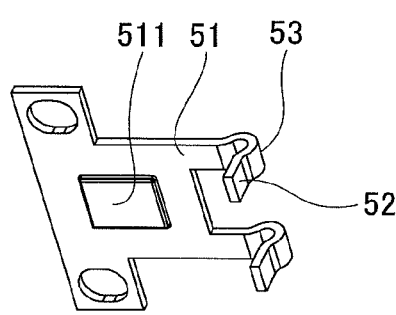
Figure 9A:
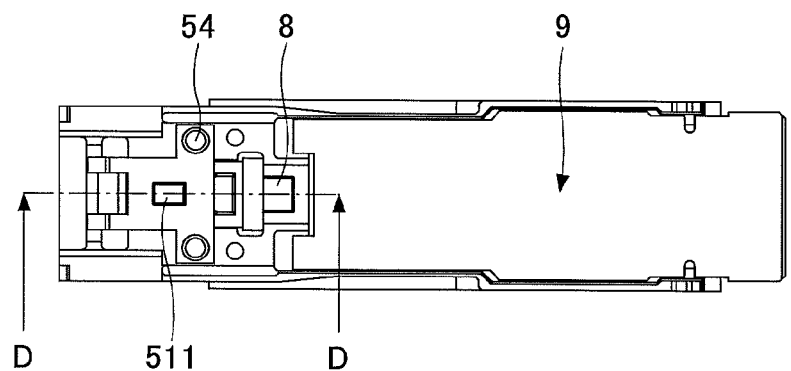
FIG. 9A is a drawing illustrating an optical module according to an embodiment.
Figure 9B:
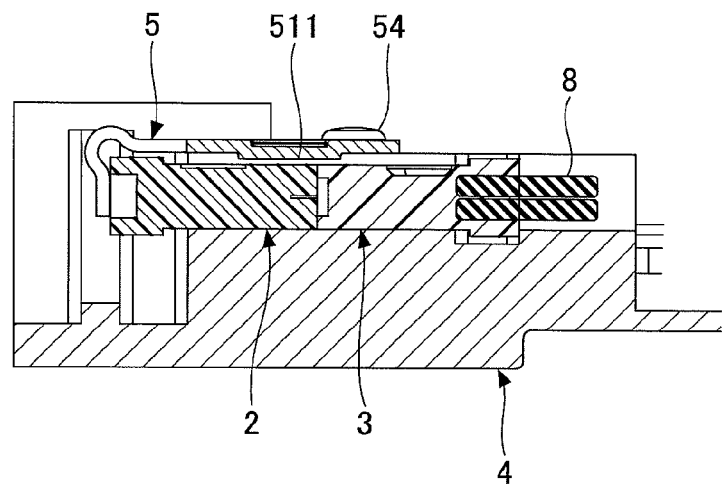
FIG. 9B is a cross-sectional view of the optical module taken along line D-D of FIG. 9A.

FIGS. 8A and 8B are drawings illustrating a variation of the ferrule clip 5. As illustrated by FIGS. 8A and 8B, the ferrule clip 5 may include a protrusion 511 like a joggle that is a part of the plate part 51 and protrudes toward the groove 42. As illustrated by FIG. 9A and FIG. 9B that is a cross-sectional view of FIG. 9A taken along line D-D, the protrusion 511 sets the vertical position of the MT ferrule 2 and the lens ferrule 3 that are fitted together.

In the optical module 1 of the present embodiment, an electric signal input from the terminal at the right end of the printed-circuit board 9 is converted by the photoelectric transducer into an optical signal, and the optical signal is transmitted via the optical waveguide, the lens ferrule 3, and an optical fiber in the MT ferrule 2 to an optical fiber in an optical cable.

On the other hand, an optical signal input from the optical fiber in the optical cable is transmitted via the optical fiber in the MT ferrule 2, the lens ferrule 3, and the optical waveguide to the photoelectric transducer, the optical signal is converted by the photoelectric transducer into an electric signal, and the electric signal is output to the terminal of the printed-circuit board 9. The photoelectric transducer may be configured to convert a signal in one direction. The optical fiber may be either a single-core optical fiber or a multi-core optical fiber.

In the present embodiment, the lens ferrule 3 is supported by the support parts 41 of the lower cover 4 in a direction opposite to the connecting direction S, the lens ferrule 3 and the MT ferrule 2 are fitted into the groove 42 and aligned with each other based on the positioning pins 22, and the MT ferrule 2 is pressed by the ferrule clip 5 in the connecting direction S. This configuration makes it possible to reliably and accurately butt-couple the MT ferrule 2 and the lens ferrule 3 and improve the optical connection between the MT ferrule 2 and the lens ferrule 3.

Also in the present embodiment, the spring parts 53 of the ferrule clip 5 have a curved shape, and the ferrule clip 5 is fastened to the lower cover 4 with the screws 54. This configuration makes it possible to prevent the ferrule clip 5 from interfering with a ferrule edge of the MT ferrule 2, and improve the durability of the MT ferrule 2. The screw holes 55 have an elongated shape. This makes it possible to adjust the relative position between the screws 54 (male screws) and the screw holes 55 in the connecting direction S, and adjust the length tolerance of the MT ferrule 2 and the ferrule clip 5.

The ferrule clip 5 may be configured to support and position the MT ferrule 2 and the lens ferrule 3 in the vertical direction. That is, the ferrule clip 5 may include either a flat plate part 51 as illustrated in FIG. 4B or a plate part 51 including the protrusion 511 as illustrated in FIG. 9B. The configuration of FIG. 4B makes it possible to prevent the lower surface of the ferrule clip 5 from interfering with the MT ferrule 2 and the lens ferrule 3, and improve the durability of the MT ferrule 2 and the lens ferrule 3.

Further in the present embodiment, as illustrated by FIGS. 4B and 4C, the contact parts 52 of the ferrule clip 5 close the openings of the through holes 23 (into which the positioning pins 22 are inserted) in an end surface of the MT ferrule 2 that is opposite to another end surface of the MT ferrule 2 connected to the lens ferrule 3. This configuration makes it possible to prevent the positioning pins 22 from protruding from the openings, and makes it possible to reliably align the MT ferrule 2 and the lens ferrule 3 with each other.

An aspect of this disclosure provides an optical module that can improve the reliability of optical connection and improve the durability of ferrules. For example, an optical module according an embodiment may be used for a home, office, or industrial electronic apparatus that requires high-speed signal transmission.

An optical module according to an embodiment of the present invention is described above. However, the present invention is not limited to the specifically disclosed embodiment, and variations and modifications may be made without departing from the scope of the present invention.

What is claimed is:

1. An optical module, comprising:
   a first ferrule;
   a second ferrule that is aligned with the first ferrule via a positioning pin and that has an enlarged part and a ferrule boot;
   a housing including a support part that accommodates the enlarged part and a housing wall that accommodates the ferrule boot; and
   a ferrule clip that is fastened to the housing and presses the first ferrule in such a direction that the second ferrule contacts the support part and that the second ferrule is pressed against the housing wall.

2. The optical module as claimed in claim 1, wherein the ferrule clip includes
   a plate part that is fastened to the housing;
   a contact part that contacts the first ferrule; and
   a spring part that connects the contact part and the plate part and biases the contact part toward the first ferrule.

3. The optical module as claimed in claim 2, wherein the spring part forms a bypassing part that does not contact an edge of the first ferrule.

4. The optical module as claimed in claim 2, wherein
   the ferrule clip includes a screw hole into which a screw for fastening the plate part to the housing is inserted; and
   the screw hole has an elongated shape, and a length of the screw hole in a direction in which the positioning pin extends is greater than a diameter of the screw.

5. The optical module as claimed in claim 2, wherein
   each of the first ferrule and the second ferrule includes a through hole into which the positioning pin is inserted; and
   the contact part closes the through hole of the first ferrule.

6. The optical module as claimed in claim 1, wherein
   the housing includes a groove that is formed by the support part and the housing wall; and
   the first ferrule and the second ferrule are fitted into the groove to set positions of the first ferrule and the second ferrule.

7. The optical module as claimed in claim 2, wherein the plate part includes a protrusion that protrudes toward the groove.

8. The optical module as claimed in claim 1, wherein the housing includes an upper cover and a lower cover, said upper and lower covers being configured to accommodate an entire portion of the first and second ferrules, and wherein the support part is integrated with the lower cover and the ferrule clip contacts only the first ferrule and the lower cover of the housing.

9. The optical module as claimed in claim 1, wherein the first and second ferrules are pressed against each other between and by the ferrule clip and the housing wall.

\* \* \* \* \*